(12) United States Patent
Moussaoui et al.

(10) Patent No.: US 7,282,896 B2
(45) Date of Patent: *Oct. 16, 2007

(54) APPARATUS AND METHOD FOR SLIDING-MODE CONTROL IN A MULTIPHASE SWITCHING POWER SUPPLY

(75) Inventors: Zaki Moussaoui, Palm Bay, FL (US); Brian L. Allen, West Melbourne, FL (US); Larry G. Pearce, Palm Bay, FL (US)

(73) Assignee: Intersil Americas, Inc., Milpitas, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 10/961,950

(22) Filed: Oct. 7, 2004

(65) Prior Publication Data

US 2006/0012351 A1   Jan. 19, 2006

Related U.S. Application Data

(60) Provisional application No. 60/588,098, filed on Jul. 15, 2004.

(51) Int. Cl.
*G05F 1/40* (2006.01)
(52) U.S. Cl. ...................................... 323/272
(58) Field of Classification Search ................ 323/272, 323/282, 283, 284, 290
See application file for complete search history.

(56) References Cited

U.S. PATENT DOCUMENTS 4,713,742 A * 12/1987 Parsley ........................ 363/124

| 5,276,387 | A | 1/1994 | Gamble |
| 5,801,517 | A | 9/1998 | Borle |
| 6,005,303 | A | 12/1999 | Hawkes et al. |
| 6,246,220 | B1 | 6/2001 | Isham et al. |
| 6,362,608 | B1 * | 3/2002 | Ashburn et al. ............ 323/272 |
| 6,376,935 | B1 | 4/2002 | Le Claire et al. |
| 6,441,597 | B1 | 8/2002 | Lethellier |

(Continued)

OTHER PUBLICATIONS

Rey, Ruiz, Pablo, Caceres "A New Current Source Control Strategy for USI-PWM Inverters" Dept of Electronics Technology, Univ. of Valladolid.

(Continued)

*Primary Examiner*—Jeffrey Sterrett
(74) *Attorney, Agent, or Firm*—Lowell W. Gresham; Jordan M. Meschkow; Charlene R. Jacobsen

(57) ABSTRACT

A current-sharing multiphase sliding-mode switching power supply (24) and method of operation are presented. A bipolar power source (22) is coupled to a switch (30) for each phase (28), each switch (30) is in turn coupled to an inductance (32), and a capacitance (36) is coupled to the inductances (32) and across a load (26). A sliding-surface generator (78) generates a sliding surface ($\sigma$). A current-balance control (80) computes a reference current as a summary statistic ($I_X$) of inductive currents ($I_L$) through the inductances (32), calculates an error current ($I_E$) for each phase (28) as a difference between the summary statistic ($I_X$) and the inductive current ($I_L$), and adjusts the sliding surface ($\sigma$) for each phase (28) so that all inductive currents ($I_L$) are substantially equal to the summary statistic ($I_X$). A switching circuit (138) switches the switches (30) in response to the sliding surface ($\sigma$).

44 Claims, 5 Drawing Sheets

U.S. PATENT DOCUMENTS

| | | |
|---|---|---|
| 6,563,294 B2 | 5/2003 | Duffy et al. |
| 6,577,109 B2 * | 6/2003 | Dancy et al. ............... 323/272 |
| 6,605,931 B2 * | 8/2003 | Brooks ...................... 323/272 |
| 6,628,106 B1 * | 9/2003 | Batarseh et al. ............ 323/222 |
| 6,703,812 B1 * | 3/2004 | Lethellier ................... 323/222 |
| 6,734,656 B2 | 5/2004 | Miller et al. |
| 6,791,304 B2 * | 9/2004 | Pearce et al. ............... 323/283 |
| 6,806,689 B2 * | 10/2004 | Schuellein et al. ......... 323/272 |
| 6,839,252 B2 * | 1/2005 | Tai et al. ..................... 363/65 |
| 6,879,137 B2 * | 4/2005 | Sase et al. .................. 323/282 |
| 6,906,536 B2 * | 6/2005 | Pearce et al. ............... 324/713 |
| 6,912,144 B1 * | 6/2005 | Clavette ...................... 363/98 |
| 7,019,502 B2 * | 3/2006 | Walters et al. ............. 323/282 |
| 7,023,188 B1 * | 4/2006 | Rice ............................ 323/271 |
| 7,091,708 B2 * | 8/2006 | Moussaoui .................. 323/272 |
| 7,098,728 B1 * | 8/2006 | Mei et al. .................... 327/538 |
| 7,109,694 B2 * | 9/2006 | Mihalka ...................... 323/283 |
| 2003/0174521 A1 | 9/2003 | Batarseh et al. |

OTHER PUBLICATIONS

Zhou and Wang "Unified Robust Zero-Error Tracking Control of CVCF PWM Converters" IEEE Transactions on Circuits & Systems, Fundamental Theory & Apps., vol. 49, No. 4, Apr. 2002.

Rossetto, Spiazzi, Tenti, Fabiano, and Licitra "Fast-Response High-Quality Rectifier with Sliding-Mode Control" Dept of Electrical Engineering, Univ. of Padova.

* cited by examiner

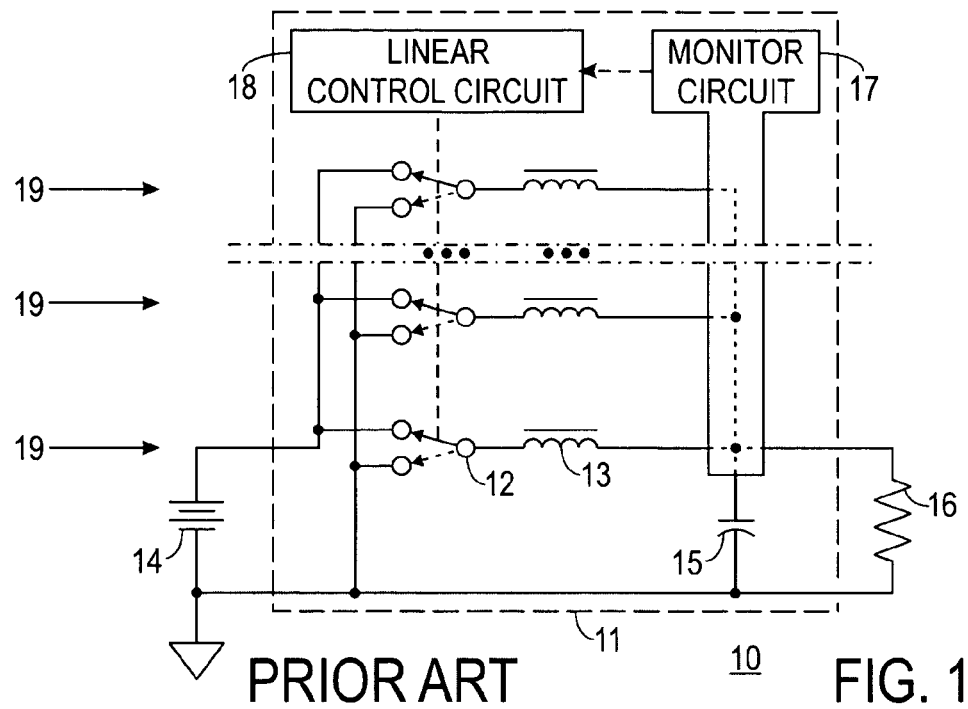
PRIOR ART    FIG. 1
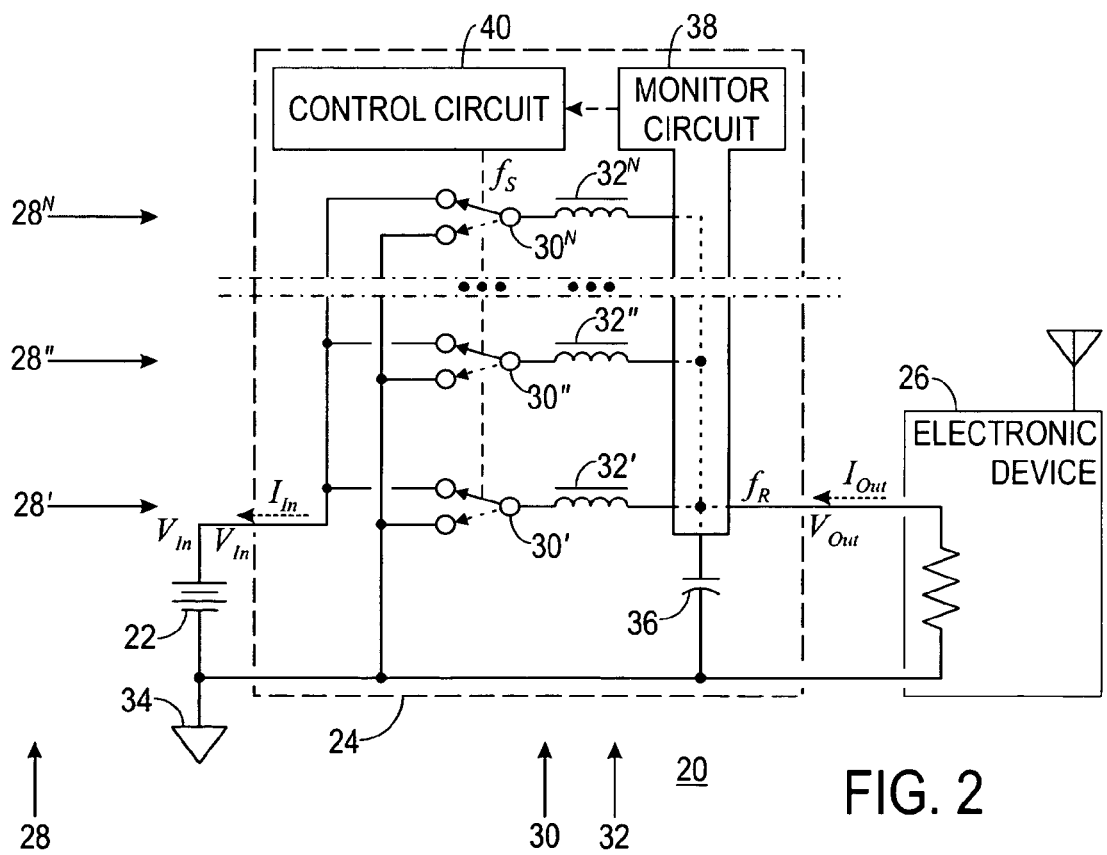
FIG. 2

APPARATUS AND METHOD FOR SLIDING-MODE CONTROL IN A MULTIPHASE SWITCHING POWER SUPPLY

RELATED INVENTIONS

The present invention claims benefit under 35 U.S.C. 119(e) to "Switching Power Supply with Sliding-Mode Control," U.S. Provisional Patent Application Ser. No. 60/588,098, filed 15 Jul. 2004, which is incorporated by reference herein.

The present invention is related to the following U.S. patent applications, each of which was filed on the same date as the present application, is assigned to the assignee hereof, and is incorporated by reference herein:

"Apparatus and Method for Fixed-Frequency Control in a Switching Power Supply," by Zaki Moussaoui, U.S. patent application Ser. No. 10/962,823;

"Apparatus and Method for State-Variable Synthesis in a Switching Power Supply," by Zaki Moussaoui, U.S. patent application Ser. No. 10/961,439; and "Apparatus and Method for Transient Control in a Multiphase Switching Power Supply," by Zaki Moussaoui and Thomas Victorin, U.S. patent application Ser. No. 10/961,439.

TECHNICAL FIELD OF THE INVENTION

The present invention relates to the field of switching power supplies. More specifically, the present invention relates to the field of multiphase switching power supplies that utilize a comprehensive feedback signal and sliding-mode control.

BACKGROUND OF THE INVENTION

Modern electronic equipment often requires low-ripple, high-current power sources at low to moderate voltages. Conventional switching power supplies can meet these requirements. In addition, switching power supplies are typically more efficient, lighter, and less expensive than their traditional analog counterparts, all of which are advantages in the modern world.

FIG. 1 shows a simplified schematic diagram of a multiphase system 10 utilizing a conventional buck-converter type of switching power supply 11. Power supply 11 incorporates N double-throw switches 12, where N is an integer greater than one. Each of the N switches 12 couples to its own one of N inductances 13, and alternately connects a first node of its inductance 13 to an input D-C power source 14 and a ground (common) each time that switch 12 is toggled. A capacitance 15 and a load 16 are coupled in parallel between a second node of all N inductances 13 and ground.

Each switch 12 is typically realized as a pair of MOSFETs or other active devices operating as double-throw switch 12, and makes a connection in either throw. For the sake of convention, however, this discussion will assume that a given switch 12 is "on" when it connects its inductance 13 to power source 14 and "off" when it connects its inductance 13 to ground.

When a given switch 12 is on, current flows into its inductance 13. The energy contained in that inductance 13 increases. Current flows from that inductance 13 into capacitance 15 and load 16. The energy contained in capacitance 15 also increases. Load 16 receives its energy primarily from that inductance 13.

When a given switch 12 is off, current flows from its inductance 13 to ground. The energy contained in that inductance 13 decreases. Current flows from capacitance 15 into load 16. Load 16 receives its energy primarily from capacitance 15.

A monitor circuit 17 monitors state variables, such as a voltage across capacitance 15 and a current through each inductance 13, to determine when to toggle each switch 12. A control circuit 18 controls the switching of the N switches 12 in response to the state variables monitored by monitor circuit 17.

Multiphase power supply 11 has N phases 19, where each switch 12 effects one of the N phases 19. Each of the N phases 19 is interleaved with the others. The power dissipated by each switch 12 is a function of the duty cycle of that switch 12. The duty cycle of a given switch 12 is typically maintained at no more than 1/N with N interleaved phases 19. Putting it another way, a symmetrical multiphase system 10 would typically provide approximately N times the current of a single-phase system using the same components for switches 12.

In concept, therefore, there is a significant advantage to multiphase system 10 with a large number of phases 19. However, problems exists with such systems 10 in that, as the number of phases 19 increases, control circuit 18 increases in complexity in order to control and maintain the timing of phases 19. This increase in complexity is reflected in a decrease in reliability and an increase in cost.

One such problem is that each of the N phases 19 should ideally provide approximately the same current. The use of components having typical tolerances may nevertheless result in a wide difference in currents between phases 19, and may result in one switch 12 carrying excessive current. This necessitates that a typical control circuit 18 must manage the individual phase currents, as well as the collective current and the phase timing.

Conventionally, a linear controller is used for control circuit 18. This is a complex circuit requiring inputs from at least N+1 state variables. Moreover, the parameters of a linear controller are tightly matched with the parameters of inductances 13, capacitance 15, and load 16. This often necessitates a change in the controller itself whenever there is even a slight change in inductances 13, capacitance 15, and/or load 16. Consequently, costs associated with control circuit 18 when realized as a linear controller may initially be undesirably high and may be exacerbated by the inability of control circuit 18 to accommodate changes in inductances 13, capacitance 15, and/or load 16.

Control circuit 18 may be realized as a hysteretic controller. Conventional implementations of hysteretic controllers, however, are unsuitable for multiphase systems 10. Even in single-phase systems, hysteretic controllers characteristically exhibit poor performance. This poor performance is due, at least in part, to the inherent lag between the voltage across capacitance 15 and the current through inductances 13. In addition, the switching frequency of switch 12 is dependent upon load 16. That is, the switching frequency will vary as load 16 varies.

Control circuit 18 for system 10 may also be realized as a sliding-mode controller, which may also be viewed as a form of second-order hysteretic controller. Conventional implementations of sliding-mode controllers are also considered unsuitable for multiphase systems 10, but might offer improvements in performance over hysteretic controllers in single-phase systems. With conventional sliding-mode controllers, however, the switching frequency is still dependent upon load 16.

Moreover, simply scaling hysteretic or sliding-mode controllers to manage the phase currents of inductances 13, the collective current, and the phase timing for switches 12 in multiphase system 10 produces no significant improvement in complexity over liner controllers, and does not address the problems of reliability and cost.

Conventional hysteretic and sliding-mode control circuits 18 used in conventional power supplies 11 have switching frequencies that are a function of load 16. That means, as load 16 changes, the switching frequency changes. Since a ripple frequency across capacitance 15, and hence across load 16, is directly related to the switching frequency, changes in load 16 bring about changes in the ripple frequency. The ripple frequency present at load 16 may cause harmonic and/or intermodulation interference with whatever electronic device serves as load 16. Were the ripple frequency to be constant, then the ripple frequency may be chosen to exist in an area of the spectrum to which load 16 is insensitive. Alternatively, relatively simple filtration within load 16 may be used to suppress the effects of the ripple frequency. Allowing ripple frequency to vary makes it difficult to ignore or suppress these effects.

Another problem exists with conventional multiphase switching power supplies utilizing either a hysteretic or sliding-mode control circuit 18 in that, under certain conditions, sudden shifts in load 16 may cause a given switch 12 to enter a lockup condition, i.e., to remain on for an excessive length of time. Under such circumstances, that switch 12 is in danger of exceeding its tolerances and failing. Specifically, the current through that switch 12 for that excessive length of time may cause that switch 12 to exceed its power rating, and may thereby cause a catastrophic failure of that switch 12.

There is a need, therefore, for a switching power supply that has a control circuit that is simple, reliable, and inexpensive, requires a minimal number of state variables, maintains substantially equal current through all inductances, is substantially independent of the tolerances of its components, is immune to variations in the load, is tolerant of switch lockup conditions, and is suitable for multiphase systems.

SUMMARY OF THE INVENTION

Accordingly, it is an advantage of the present invention that an apparatus and method for sliding-mode control in a multiphase switching power supply are provided.

It is another advantage of the present invention that a multiphase switching power supply is provided that has a control circuit that is simple, reliable, and inexpensive.

It is another advantage of the present invention that a multiphase switching power supply is provided that requires no more than two state variables, regardless of the number of phases.

It is another advantage of the present invention that a multiphase switching power supply is provided that is substantially independent of component tolerance.

It is another advantage of the present invention that a multiphase switching power supply is provided that shares current substantially equally among all phases.

The above and other advantages of the present invention are carried out in one form by a method of operating a multiphase switching power supply having N phases, where N is an integer greater than one. The method incorporates generating a comprehensive feedback signal from no more than two state variables of the power supply, translating the comprehensive feedback signal into a stream of switching pulses, switching N switches in response to the stream of switching pulses, and effecting one of the N phases with each of the N switches.

The above and other advantages of the present invention are carried out in another form by a multiphase switching power supply having N phases, where N is an integer greater than one. The power supply includes N switches configured to be coupled to a bipolar power source, N inductances, wherein each of the N inductances is coupled to one of the N switches, a capacitance coupled to each of the N inductances and configured to be coupled across a load, a monitor circuit coupled to each of the N inductances and the capacitance and configured to monitor a parameter of the power supply, a feedback-signal generator coupled to the monitor circuit and configured to generate a comprehensive feedback signal in response to the parameter, a pulse-width-modulation (PWM) generator coupled to the comprehensive feedback-signal generator and configured to translate the feedback signal into a stream of switching pulses, and a phase selector coupled to the N switches, coupled to the PWM generator, and configured to switch the N switches in response to the stream of switching pulses so that each of the N switches effects one of the N phases.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a simplified schematic diagram of a multiphase system utilizing a prior-art switching power supply;

FIG. 2 shows a simplified schematic diagram of a multiphase system in accordance with a preferred embodiment of the present invention;

DETAILED DESCRIPTION OF THE PREFERRED EMBODIMENTS

Figure 3:
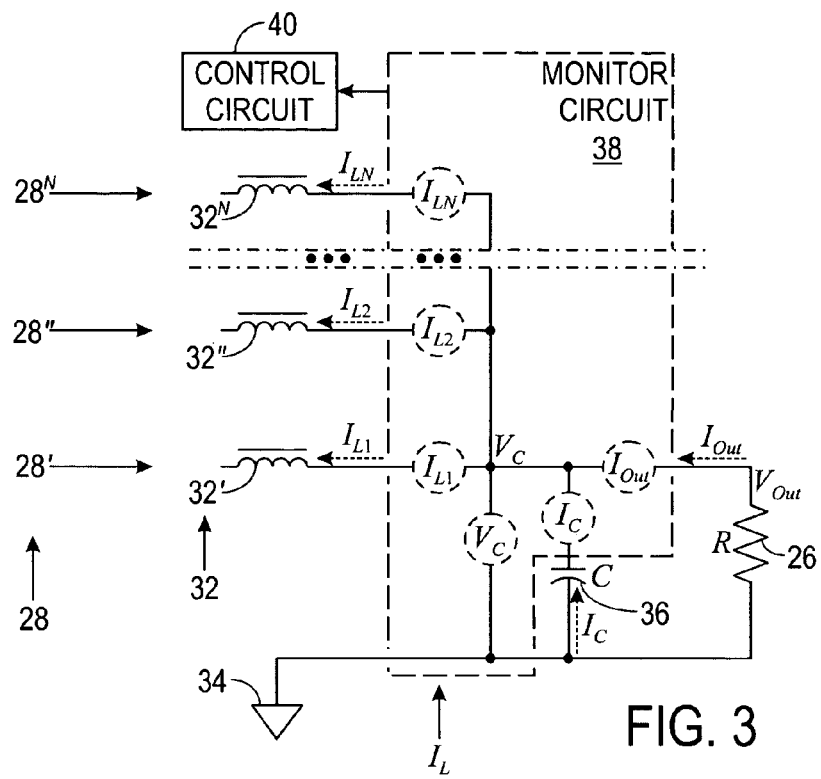
FIG. 3 shows a block diagram of a monitor circuit for the power supply of FIG. 2 in accordance with a preferred embodiment of the present invention.

FIG. 2 shows a simplified schematic diagram of a multiphase system 20 including a D-C power source 22 coupled to a switching power supply 24, which is coupled to a load 26. The following discussion refers to FIG. 2.

System 20 is made up of power source 22, power supply 24, and load 26. Power source 22 is configured to provide D-C energy in a first form as input energy to power supply 24. This input energy consists of an input voltage $V_{In}$ at an input current $I_{In}$. Power source 22 may be a battery, an A-C to D-C converter, a solar array, a generator, an alternator, or any other source of suitable D-C energy.

Load 26 demands D-C energy in a second form as output energy from power supply 24. This output energy consists of an output voltage $V_{Out}$ at an output current $I_{Out}$. Load 26 may be any electronic device, but is often a computing device or a communications device, e.g., a computer, a communications satellite, cellular equipment, or the like.

Power supply 24 is coupled between power source 22 and load 26, and is configured to convert D-C energy from the first form supplied by power source 22 into the second form required by load 26.

The parameters of load 26 may change, often abruptly, and often significantly. For example load 26 may be or include a computer having a processor demanding a significant current, as well as auxiliary devices, e.g., a motor and/or a subprocessor, either of which also demands significant current, and either or both of which may be instantaneously activated or deactivated to fulfill a given task. Such changes may result in transients, i.e., abrupt and significant shifts in output current $I_{Out}$. Being abrupt, these transients affect output current $I_{Out}$ dynamically (i.e., during the change) and statically (after the change). From a dynamic (A-C) perspective, load 26 may be said to have an impedance Z, where the dynamic value of output current $I_{Out}$ at a given instant is:

$$I_{Out} = \frac{V_{Out}}{Z}. \quad (1)$$

From a static (D-C) perspective, impedance Z includes a resistance R, where the static value of output current $I_{Out}$ at a given time is:

$$I_{Out} = \frac{V_{Out}}{R}. \quad (2)$$

Those skilled in the art will appreciate that, since it is often nearly impossible to predict the energy demands of load 26 for any given point in time, power source 22 and power supply 24 are normally designed to meet a range of output energy demands, from a predetermined minimum to a predetermined maximum, thereby encompassing the requirements of load 26.

In the preferred embodiment, power supply 24 is a sliding-mode switching power supply 24 (i.e., a second-order hysteretic switching power supply) configured to receive D-C input voltage $V_{In}$ from power source 22 and to supply D-C output voltage $V_{Out}$ to load 26.

Power supply 24 is configured to divide input voltage $V_{In}$ into N phases 28, where N is a positive integer greater than one. Power supply 24 contains N switches 30, where each switch 30 effects one of the N phases 28. The N switches 30 are coupled to N inductances 32 in a one-to-one correspondence. Each switch 30 alternately connects its particular inductance 32 between power source 22 and a common or ground 34. All N inductances 32 couple to a capacitance 36. Load 26 couples to the N inductances 32 and across capacitance 36.

Switches 30 are typically realized as pairs of MOSFETs or other active devices operating as double-throw switches 30, and make connections in either throw. For the sake of convention, however, this discussion will assume that a given switch 30 is "on" when it connects its inductance 32 to power source 22 and "off" when it connects its inductance 32 to ground 34.

FIG. 3 shows a block diagram of a monitor circuit 38 in accordance with a preferred embodiment of the present invention. The following discussion refers to FIGS. 2 and 3.

FIG. shows a block diagram of a monitor circuit 38 in accordance with a preferred embodiment of the present invention. The following discussion refers to FIGS. 3 and 4.

In the preferred embodiment, monitor circuit 38 is coupled to each of the N inductances 32 and to capacitance 36. Monitor circuit 38 monitors state variables for power supply 24. As a minimum, monitor circuit 38 monitors a capacitive voltage $V_C$ (i.e., a voltage across capacitance 36). Since capacitance 36 is coupled directly across load 26, capacitive voltage $V_C$ is also output voltage $V_{Out}$.

If, as in the preferred embodiment, monitor circuit 38 monitors nothing more than output voltage $V_{Out}$, monitor circuit 38 may be implemented as nothing more than a conductor coupling capacitance 36 to a control circuit 40. In alternative embodiments, however, monitor circuit 38 may include sensing devices, shown as dotted-line circles in FIG. 3, to monitor inductive currents $I_{L1}$ through $I_{LN}$ flowing through each of inductances 32, a capacitive current $I_C$ flowing through capacitance 36, or output current $I_{Out}$ flowing through load 26.

Figure 4:
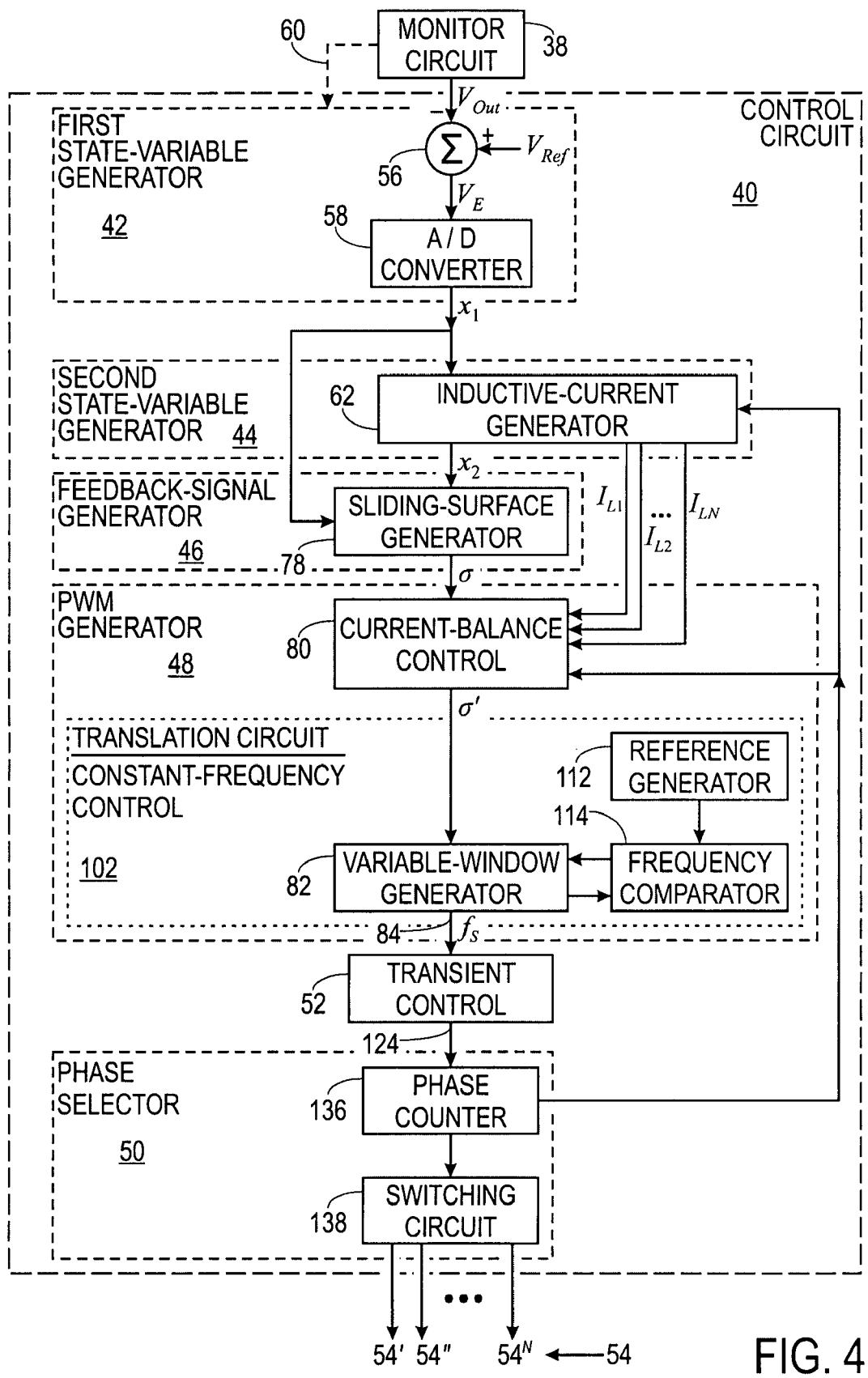
FIG. 4 shows a block diagram of a control circuit for the power supply of FIG. 2 in accordance with a preferred embodiment of the present invention.

FIG. 4 shows a block diagram of control circuit 40 configured in accordance with a preferred embodiment of the present invention. The following discussion refers to FIGS. 2, 3, and 4.

Control circuit 40 incorporates a first state-variable generator 42, a second state-variable generator 44, a feedback-signal generator 46, a pulse-width-modulation (PWM) generator 48, and a phase selector 50. Each of these components of control circuit 40 is discussed in detail hereinafter.

Control circuit 40 causes power supply 24 to provide output voltage $V_{Out}$ and output current $I_{Out}$ required by load 26. This is accomplished by controlling the timing of the outputs 54 of phase selector 50, which couple to the N switches 30. Control circuit 40 therefore controls the switching of the N switches 30 to produce the N phases 28.

In a preferred embodiment, control circuit 40 receives output voltage $V_{Out}$, which is also capacitive voltage $V_C$, from monitor circuit 38. Output voltage $V_{Out}$ is routed to first state-variable generator 42.

Within first state-variable generator 42, output voltage $V_{Out}$ is subtracted from a fixed reference voltage $V_{Ref}$ by a subtraction circuit 56. Subtraction circuit 56 may be implemented as a simple difference amplifier, though this is not a requirement of the present invention.

Desirably, reference voltage $V_{Ref}$ is a constant value during normal operation, and is equal to the desired voltage to be produced by power supply 24. Reference voltage $V_{Ref}$ need supply only a small amount of current, and can therefore be easily generated to a desired accuracy using a wide variety of techniques well known to those skilled in the art.

An output of subtraction circuit 56 is the difference between reference voltage $V_{Ref}$ and output voltage $V_{Out}$. The output of subtraction circuit 56 is therefore an analog error voltage $V_E$ that represents a difference between output voltage $V_{Out}$ (the actual output voltage) and reference voltage $V_{Ref}$ (the desired output voltage). Thus, during normal operation any deviation of output voltage $V_{Out}$ from reference voltage $V_{Ref}$ represents an error from the desired voltage in the amount of the deviation.

An analog-to-digital (A/D) converter 58 then converts analog error voltage $V_E$ into a digital error voltage $x_1$:

$$x_1 = V_E = V_{Out} - V_{Ref} \quad (3)$$

This digital error voltage $x_1$ is a first (voltage) state variable $x_1$ of power supply 24.

It will be appreciated by those skilled in the art that in alternative embodiments other signals from monitor circuit 38 may be routed to first state-variable generator 42 for processing in other manners not discussed herein. These embodiments are represented by a dotted line 60 in FIG. 4. Such an alternative signal may correspond to output current $I_{Out}$ flowing through load 26, correspond to capacitive current $I_C$ flowing through capacitance 36, or independently correspond to inductive currents $I_{L1}$ through $I_{LN}$ flowing in one or more of inductances 32. The use of these or other alternative signals does not depart from the spirit of the present invention. In the preferred embodiment, however, collective and individual inductive currents are estimated from first state variable $x_1$, as discussed in more detail hereinafter.

In the preferred embodiment, A/D converter 58 is a small (4-bit), fast (50 MHz) converter. This is a simple and inexpensive approach. Those skilled in the art will appreciate that other A/D converters may be used without departing from the spirit of the present invention.

Subsequent to A/D converter 58, the circuits and functions of control circuit 40 may be implemented using digital hardware logic and/or microprocessor circuits, the design and logic of which can vary widely from application-to-application but which can be readily adapted by those skilled in the digital electronic arts.

Figure 5:
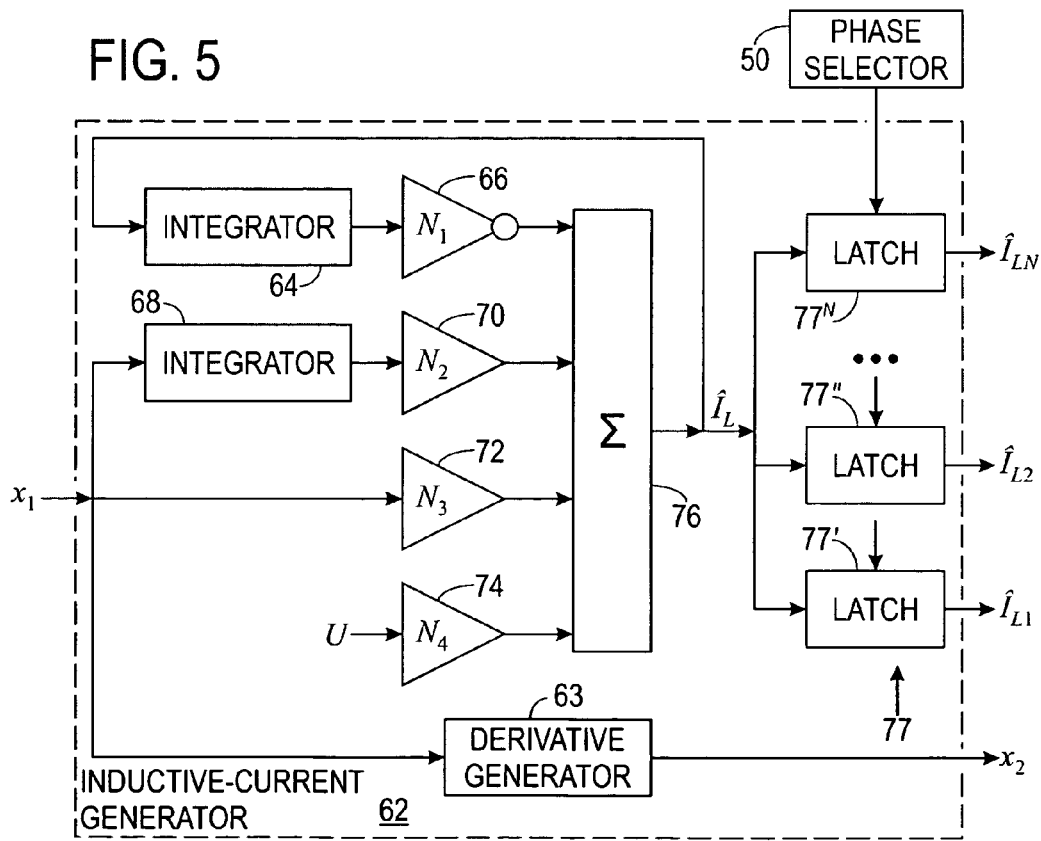
FIG. 5 shows a simplified block diagram of an inductive-current generator for the control circuit of FIG. 4 in accordance with a preferred embodiment of the present invention.

FIG. 5 shows a simplified block diagram of an inductive-current generator 62 for the control circuit 40 in accordance with a preferred embodiment of the present invention. The following discussion refers to FIGS. 2, 4, and 5.

In the preferred embodiment, first state variable $x_1$, derived from output voltage $V_{Out}$ is the only state variable that needs to be derived directly from a physically monitored parameter of power supply 24. Any other state variable is derived by calculation from first state variable $x_1$.

First state variable $x_1$ is output from first state-variable generator 42 and routed to second-state-variable generator 44 and feedback-signal generator 46. Within second state-variable generator 44, first state variable $x_1$ passes to inductive-current generator 62. Within inductive-current generator 62, a derivative generator 63 calculates a second state variable $x_2$ (i.e., an error rate $x_2$ (i.e., a rate of error voltage $x_1$)) by extracting the derivative of first state variable $x_1$ over time:

$$x_2 = \frac{dx_1}{dt} = \frac{dV_{Out}}{dt} = \frac{I_C}{C}. \quad (4)$$

This is equivalent to taking the derivative of output voltage $V_{Out}$ over time, and is substantially equal to capacitive current $I_C$ divided by a value C of capacitance 36.

In the preferred embodiment, synthesized inductive currents $\hat{I}_{L1}$, $\hat{I}_{L2}$, and so on through $\hat{I}_{LN}$ for all N phases 28 are synthesized from first state variable $x_1$. Each synthesized inductive current $\hat{I}_{LN}$ is calculated as:

$$\hat{I}_L(s) = \frac{\beta \cdot C \cdot s - \frac{1}{L} + \frac{\beta}{R}}{(s+\beta)} \cdot x_1(s) + \frac{V_{In}}{L \cdot (s+\beta)} \cdot U(s), \quad (5)$$

where s is the Laplace variable obtained by taking the Laplace transform, L is the value of inductance 32 for the current phase 28, R is the value of the resistive component of load 26, U is a switching flag equal to 1 when the switch 30 effecting the current phase 28 is on and 0 when that switch 30 is off, $V_{In}$ is the input voltage, and β is timing a constant chosen to be faster than the time constant of feedback signal generator 46.

In the preferred embodiment, equation (5) is realized by the circuit in FIG. 5. In this circuit there are two integrators and four gain stages. A second state-variable integrator 64 integrates second state variable $x_2$, i.e., expresses the function $s^{-1}$, in a feedback loop, then passes the result through an $N_1$ gain stage 66, where:

$$N_1 = -\beta. \quad (6)$$

A first state-variable integrator 68 integrates first state variable $x_1$, i.e., expresses the function $s^{-1}$, then passes the result through an $N_2$ gain stage 70, where:

$$N_2 = \frac{\beta}{R} - \frac{1}{L}. \quad (7)$$

First state variable $x_1$ passes through an $N_3$ gain stage 72, where:

$$N_3 = \beta \cdot C. \quad (8)$$

Finally, switching flag U passes through an $N_4$ gain stage 74, where:

$$N_4 = \frac{1}{L}. \quad (9)$$

The outputs of each of gain stages 66, 70, 72, and 74 are summed in a summing circuit 76 to produce synthesized inductive current $\hat{I}_L$ for that phase 28. A series of N latches 77, one for each of the N phases 28, are controlled by a signal from phase selector 50 (discussed hereinafter) to latch synthesized inductive current $\hat{I}_L$ coincident with each phase 28 to produce the N synthesized inductive currents $\hat{I}_{L1}$ through $\hat{I}_{LN}$.

By latching or otherwise preserving each of the N synthesized inductive currents $\hat{I}_{L1}$ through $\hat{I}_{LN}$ throughout a cycle of N phases 28, synthesized inductive currents $\hat{I}_{L1}$ through $\hat{I}_{LN}$ may represent each of inductive currents $I_{L1}$ through $I_{LN}$, respectively. Inductive-current generator 62 derives a first synthesized inductive current $\hat{I}_{L1}$ representing a first inductive current $I_{L1}$ through a first inductance 32' during a first phase 28', a second synthesized inductive current $\hat{I}_{L2}$ representing a second inductive current $I_{L2}$ through a second inductance 32'' during a second phase 28'', and so on through an $N^{th}$ synthesized inductive current $\hat{I}_{LN}$ representing an $N^{th}$ inductive current $I_{LN}$ through an $N^{th}$ inductance $32^N$ during an $N^{th}$ phase $28^N$.

Those skilled in the art will appreciate that synthesized inductive currents $\hat{I}_{L1}$ through $\hat{I}_{LN}$ need not be equal to the inductive currents $I_{L1}$ through $I_{LN}$ they represent. What is important, and what is fulfilled by equation (5) and by the circuit in FIG. 5, is that the ratios between each of synthesized inductive currents $\hat{I}_{L1}$ through $\hat{I}_{LN}$ and the ratios between the corresponding inductive currents $I_{L1}$ through $I_{LN}$ are equal. That means that an action taken in response to synthesized inductive currents $\hat{I}_{L1}$ through $\hat{I}_{LN}$ will affect inductive currents $I_{L1}$ through $I_{LN}$ correspondingly. Also, if any inductive current $I_{L1}$ through $I_{LN}$ were to be directly monitored by monitor circuit 38 (FIG. 3), then all of inductive currents $I_{L1}$ through $I_{LN}$ would be known by the use of synthesized inductive currents $\hat{I}_{L1}$ through $\hat{I}_{LN}$.

Since each of synthesized inductive currents $\hat{I}_{L1}$ through $\hat{I}_{LN}$ represents one of the N inductive currents $I_{L1}$ through $I_{LN}$, this discussion hereinafter refers to either synthesized or physical inductive currents as inductive currents $I_{L1}$ through $I_{LN}$.

Since each of synthesized inductive currents $\hat{I}_{L1}$ through $\hat{I}_{LN}$ represents one of the N inductive currents $I_{L1}$ through $I_{LN}$, this discussion hereinafter refers to either synthesized or physical inductive currents as inductive currents $I_{L1}$ through $I_{LN}$.

In an alternative embodiment, inductive current generator 62 may directly receive one or more of inductive currents $I_{L1}$ through $I_{LN}$ from A/D converter 58, or may associate output current $I_{Out}$ with the currently active phase 28 to parse out inductive currents $I_{L1}$ through $I_{LN}$ for each phase 28.

Feedback-signal generator 46 generates a single feedback signal σ. Moreover, feedback-signal generator 46 produces single feedback signal σ from no more than two state variables of power supply 24, error voltage $x_1$ and error rate $x_2$. In the preferred embodiment, single feedback signal σ controls all N phases 28. Accordingly, single feedback signal σ is a comprehensive feedback signal σ because it influences all N phases 28 of multiphase power supply 24.

Figure 6:
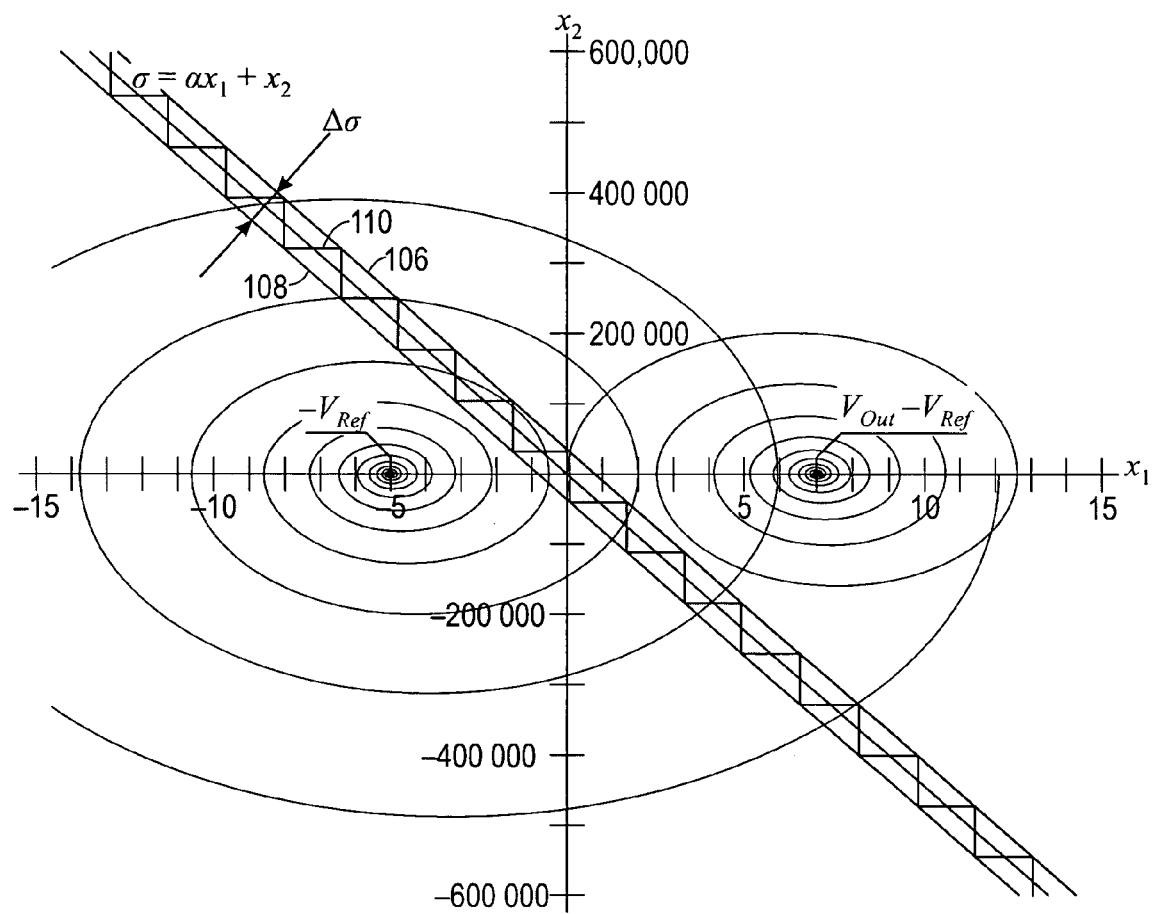
FIG. 6 shows a phase plot depicting a sliding surface and a variable window therefor in accordance with a preferred embodiment of the present invention.

FIG. 6 shows a phase plot depicting a sliding surface σ and a variable window Δσ therefor in accordance with a preferred embodiment of the present invention. The following discussion refers to FIGS. 2, 3, 4, and 6.

In the preferred embodiment, feedback-signal generator 46 within control circuit 40 is a sliding-surface generator 78 that generates comprehensive feedback signal σ in the form of a single sliding surface σ. By generating comprehensive feedback signal σ as single sliding surface σ, the number of state variables required by feedback-signal generator 46 may be kept to a minimum (i.e., two: one monitored, one calculated) regardless of the number N of phases 28. This small number of state variables is desirable because it leads away from the rapidly expanding complexity encountered in conventional multiphase power supplies that monitor N+1 state variables to control N phases 28. The use of a small number of state variables therefore improves reliability and decreases expense over traditional methodologies.

Hereinafter in this discussion, feedback-signal generator 46 and feedback signal σ are referred to as sliding-surface generator 78 and sliding surface σ, respectively. Sliding-surface generator 78 is discussed in more detail hereinafter.

FIG. 6 depicts the state variables as error voltage $x_1$ on the horizontal axis and error rate $x_2$ (i.e., synthesized current) on the vertical axis. As such, FIG. 6 depicts the operation of power supply 24 as defined by its state variables $x_1$ and $x_2$. Two spirals are depicted on the horizontal axis, with one spiral centered about a positive value where:

$$x_1 = V_{Out} - V_{Ref}, \ x_2 = 0, \tag{10}$$

and another spiral centered around a negative value where:

$$x_1 = -V_{Ref}, \ x_2 = 0. \tag{11}$$

The positive-value spiral depicts an exemplary track state variables $x_1$ and $x_2$ might follow if switches 30 were continuously on, and the negative-value spiral depicts an exemplary track state variables $x_1$ and $x_2$ might follow if switches 30 were continuously off. Of course, switches 30 are neither continuously on nor continuously off, but are switched on and off with the goal of maintaining a value of the state variables where:

$$x_1 = 0, \ x_2 = 0. \tag{12}$$

It is a task of sliding-surface generator 78 to identify when such switching should take place, although sliding surface σ generated by sliding-surface generator 78 may be adjusted as discussed herein by a current-balance control 80 and a variable-window generator 82.

Sliding-mode controls are known to those skilled in the art. Sliding-surface generator 78 is a sliding-mode control that has been adapted for use with power supply 24. In the preferred embodiment, sliding-surface generator 78 generates single sliding surface σ as a function:

$$\sigma = \alpha \cdot x_1 + x_2, \tag{13}$$

where α is a constant. First state variable (error voltage) $x_1$ is a monitored voltage state variable, and second state variable (error rate) $x_2$ is a derived (synthesized) current state variable.

The goals used in establishing this relationship are known to those skilled in the art of sliding-mode controls. In general, error voltage $x_1$, error rate $x_2$ (the rate of change of error voltage $x_1$ over time), and even the acceleration of error voltage $x_1$ in time may all be taken into account in defining sliding surface σ. Of course, those skilled in the art will appreciate that sliding surface σ is an idealized result. In practice, the state of power supply 24 will seldom be precisely on sliding surface σ. Rather, switches 30 are controlled so that future operation of power supply 24 will, (except for the operations of current-balance control 80 and variable-window generator 82), be directed toward sliding surface σ and the origin of the phase plot shown in FIG. 6. By thus controlling the activation and deactivation of switches 30, the operation of power supply 24, as demonstrated by its state variables $x_1$ and $x_2$, will tend to "slide" along sliding surface σ.

In the preferred embodiment, constant α has a range:

$$0 \leq \alpha \leq \frac{1}{\tau}, \tag{14}$$

where τ is a time constant:

$$\tau = R \cdot C, \tag{15}$$

where C is the value of capacitance 36 and R is the resistance of load 26 (i.e., the resistive component of load impedance Z).

As discussed hereinbefore in conjunction with equations (3) and (4), first state variable (error voltage) $x_1$ represents a difference between output voltage $V_{Out}$ and reference voltage $V_{Ref}$, and second state variable (error rate) $x_2$ represents a rate of change of first state variable $x_1$ and is the derivative thereof.

By physically measuring only first state variable $x_1$ and simulating second state variable $x_2$ from first state variable $x_1$, only a single sliding surface (comprehensive feedback signal) σ is required to control any number N of phases 28. Moreover, by refraining from physically measuring a current state variable, no lossy current-measuring devices are required. This further improves reliability and decreases cost in addition to improving efficiency.

Sliding-surface generator 78 generates sliding surface σ, a signal that summarizes and describes the operating state of power supply 24. Those skilled in the art will appreciate that sliding surface σ may also be called a sliding or switching line, curve, plane, or hyperplane in other sliding-mode control applications.

PWM generator 48 is coupled to feedback-signal generator 46. PWM generator 48 is configured to translate single sliding surface σ into a PWM signal 84 consisting of a stream of switching pulses 86. Phase selector 50 (discussed hereinafter) routes different switching pulses 86 within PWM signal 84 to different switches 30.

Figure 7:
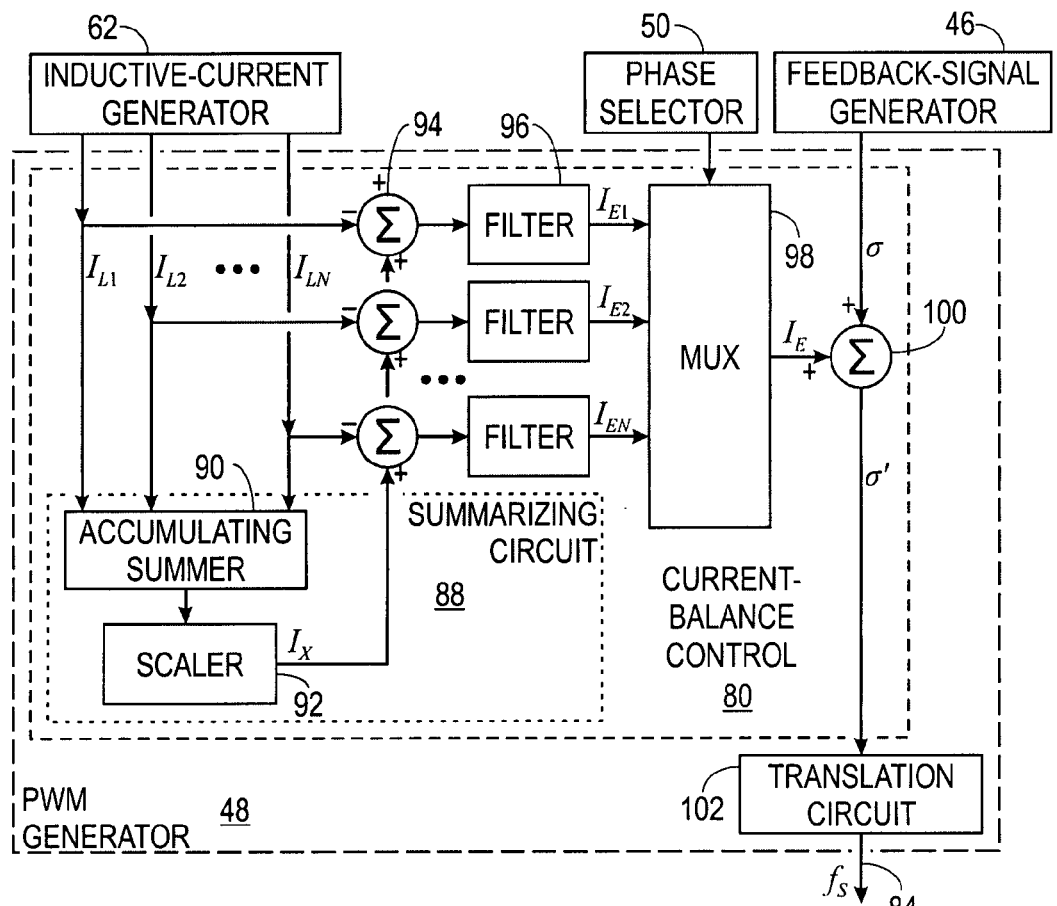
FIG. 7 shows a simplified block diagram of a current-balance control for the control circuit of FIG. 4 in accordance with a preferred embodiment of the present invention.

FIG. 7 shows a block diagram of current-balance control 80 for power supply 24 in accordance with a preferred embodiment of the present invention. The following discussion refers to FIGS. 2, 4, and 7.

It is desirable that inductive currents $I_{L1}$ through $I_{LN}$ be substantially equal. When inductive currents $I_{L1}$ through $I_{LN}$ are substantially equal, power supply 24 can supply the maximum current within the capacity of a given set of switches 30, i.e., without unduly stressing any given switch 30. This maximizes overall reliability.

Within PWM generator 48, current-balance control 80 adjusts sliding surface σ and alters it into an adjusted sliding surface σ' for each phase 28 so that the N inductive currents $I_{L1}$ through $I_{LN}$ become substantially equal. That is, current-balance control 80 provides a plurality of adjustments to sliding surface σ. These adjustments exhibit a one-to-one correspondence with switches 30 and inductances 32, and adjust the widths of switching pulses 86 generated by PWM generator 48 so that inductive currents $I_{L1}$ through $I_{LN}$ are substantially equal.

Current-balance control 80 receives inductive currents $I_{L1}$ through $I_{LN}$ from inductive-current generator 62. In the preferred embodiment, inductive-current generator 62 generates synthesized inductive currents $I_{L1}$ through $I_{LN}$ from first state variable (error voltage) $x_1$, wherein each synthesized inductive current $I_{L1}$ through $I_{LN}$ corresponds to a physical inductive current $I_{L1}$ through $I_{LN}$ flowing in a respective inductance 32. This is not a requirement of the present invention. In an alternative embodiment, inductive currents $I_{L1}$ through $I_{LN}$ received from inductive-current generator 62 may be physical inductive current $I_{L1}$ through $I_{LN}$ without departing from the spirit of the present invention.

Within current-balance control 80 inductive currents $I_{L1}$ through $I_{LN}$ are processed by a summarizing circuit 88 to produce a signal $I_X$ that corresponds to a summary statistic characterizing all of inductive currents $I_{L1}$ through $I_{LN}$. Signal $I_X$ is hereinafter summary statistic $I_X$.

In the preferred embodiment, an accumulating summer 90 and a scaler 92 within summarizing circuit 88 serve to produce summary statistic $I_X$ as an arithmetic mean of inductive currents $I_{L1}$ through $I_{LN}$:

$$I_X = \frac{I_1 + I_2 + \ldots + I_N}{N}. \tag{16}$$

Having summary statistic $I_X$ as an arithmetic mean of inductive currents $I_{L1}$ through $I_{LN}$ is desirable because it is simple and straightforward to accomplish. However, those skilled in the art will appreciate that it is not a requirement of the present invention that summary statistic $I_X$ be an arithmetic mean of inductive currents $I_{L1}$ through $I_{LN}$, and that other implementations of summary statistic $I_X$ may be used without departing from the spirit of the present invention.

Summary statistic $I_X$ serves as a reference current. For each phase 28, current-balance control 80 calculates an error current $I_E$ as a difference signal between summary statistic $I_X$ and a respective inductive current $I_L$:

$$I_E = I_{Ref} - I_L. \tag{17}$$

The N inductive currents $I_{L1}$ through $I_{LN}$ are passed to N differencing circuits 94 and filters 96. Each of inductive currents $I_{L1}$ through $I_{LN}$ is subtracted from summary statistic $I_X$ by one of differencing circuits 94 and filtered by one of filters 96 to produce one of N signals $I_{E1}$ through $I_{EN}$ serving as error currents, i.e., differences between summary statistic $I_X$ and each inductive current $I_{L1}$ through $I_{LN}$. The N signals $I_{E1}$ through $I_{EN}$ are hereinafter N error currents $I_{E1}$ through $I_{EN}$.

The N error currents $I_{E1}$ through $I_{EN}$ are passed to a multiplexer 98. Multiplexer 98 receives a signal from phase selector 50 (discussed hereinafter) to identify the currently active phase 28. The output of multiplexer 98 is error current $I_E$ for the currently active phase 28.

Error current $I_E$ passes to a summing circuit 100. For each phase 28, error current $I_E$ is summed with sliding surface σ in summing circuit 100 to produce adjusted sliding surface σ' so that inductive current $I_L$ for that phase 28 is more closely equal to summary statistic $I_X$.

In an $M^{th}$ one of the N phases 28, where M is an integer in the range $1 \leq M \leq N$, $M^{th}$ inductive current $I_{LM}$ is a phase current for that $M^{th}$ phase 28 and is germane to only that $M^{th}$ phase 28. More specifically, when, in an $M^{th}$ phase 28, inductive current $I_{LM}$ has been unequal to summary statistic $I_X$, an error current $I_{EM}$ is added as an additive offset to sliding surface σ to produce adjusted sliding surface σ'. Error current $I_{EM}$ (i.e., the additive offset) may be either positive or negative, and is desirably proportional to the difference between inductive current $I_{LM}$ and summary statistic $I_X$. The offset will make sliding surface σ appear slightly different than it really is, and the operation of power supply 24 for that phase 28 will slide along adjusted sliding surface σ' with an appropriate higher or lower inductive current $I_{LM}$. In this manner, current-balance control 80 successively adjusts sliding surface σ' in response to error currents $I_E$ so that at each iteration inductive currents $I_{L1}$ through $I_{LN}$ are rendered more closely equal for all N phases 28.

The following discussion refers to FIGS. 2, 4, and 6.

Adjusted sliding surface σ' is routed to a translation circuit 102 configured to convert adjusted sliding surface σ' into PWM signal 84, wherein PWM signal 84 consists of a stream of switching pulses 86 at substantially a switching frequency $f_S$. In the preferred embodiment, translation circuit 102 is realized as a constant-frequency control 104, which serves to maintain switching frequency $f_S$ substantially constant. Those skilled in the art will appreciate, however, that this is not a requirement of the present invention. Other methodologies may be used to realize translation circuit 102, such as a simple comparator circuit (not shown) well known to those skilled in the art, without departing from the spirit of the present invention.

Within constant-frequency control 104, variable-window generator 82 generates variable window Δσ as a width of sliding surface σ. Switching frequency $f_S$ is a function of a width of variable window Δσ. That is, as variable window Δσ narrows, switching frequency $f_S$ increases, and vice-versa. Variable window Δσ therefore serves to control switching frequency $f_S$.

Variable-window generator 82 is configured to compare sliding surface σ to two offset values. In particular, variable-window generator 82 bifurcates sliding surface σ. Whenever operation greater than a high threshold 106 of sliding surface σ is detected, variable-window generator 82 activates, causing a switch 30 to switch on. This effects one of the N phases 28. Whenever operation less than a low threshold 108 of sliding surface σ is detected, variable-window generator 82 deactivates, causing the currently active switch 30 to switch off. Those skilled in the art will appreciate that other methodologies for the operation of variable-window generator 82 may be used without departing from the spirit of the present invention.

FIG. 6 also depicts an exemplary oscillating sliding signal 110 between the limits of high threshold 106 and low threshold 108. Sliding signal 110 depicts the operation of power supply 24, as defined by its state variables $x_1$ and $x_2$, as it slides along sliding surface σ. Oscillation results from switching switches 30 at switching frequency $f_S$. Thus, the oscillation frequency of sliding signal 110 tracks switching frequency $f_S$.

Switching frequency $f_S$ produces a ripple frequency $f_R$ across capacitance 36, and therefore across load 26. It is desirable that ripple frequency $f_R$ be substantially fixed or constant so that any interference and/or harmonic effects produced thereby may more easily be suppressed within the electronic device serving as load 26. A constant predetermined frequency $f_P$ (not shown) serves as an ideal or target ripple frequency $f_R$. That is, power supply 24 in general, and constant-frequency control 104 in particular, maintain switching frequency $f_S$, and therefore ripple frequency $f_R$, substantially equal to constant predetermined frequency $f_P$.

Within translation circuit 102, a reference generator 112 generates a fixed reference frequency $f_X$, and a frequency comparator 114 compares switching frequency $f_S$ against reference frequency $f_X$ to produce a frequency error $E_f$. Frequency error $E_f$ is applied to variable-window generator 82. Variable-window generator 82 forms and/or adjusts variable window Δσ in response to frequency error $E_f$.

Transients may occur in response to sudden and/or significant changes in load 26. Under certain conditions, these transients may drive power supply 24 into a lockup condition for an undesirably long duration. Eventually, the lockup condition will clear, even when inductances 32, capacitance 36, and/or load 26 are vastly mismatched and/or vary widely from design ideals.

During such a transient, feedback-signal generator 46 may output sliding surface σ that might, when further processed by translation circuit 102, instruct the switch 30 effecting the currently active phase 28 to remain in its on condition. This may lead to a failure of that switch 30, and is therefore undesirable.

PWM signal 84 is output from PWM generator 48, and input to an optional transient control 52. Within transient control 52, PWM signal 84 is modified to become a modified PWM signal 124. Modified PWM signal 124 is configured to regulate a duration of a lockup condition of any given switch 30 due to a transient from load 26. By regulating the duration of a lockup condition, transient control 52 inhibits potential damage to that switch 30, and to power supply 24.

In the event of a lockup condition, transient control 52 causes the currently active phase 28 to terminate and the next phase 28 to commence after a predetermined duration. In other words, switches 30 are switched from the currently active phase 28 to the next phase 28. Lockup conditions are thereby tolerated.

Transient control 52 is a desirable but optional component in control circuit 40. This discussion assumes the presence of transient control 52, and that PWM signal 84 becomes modified PWM signal 124. If transient control 52 is omitted, then PWM signal 84 is not modified, i.e., modified PWM signal 124 is PWM signal 84.

Figure 8:
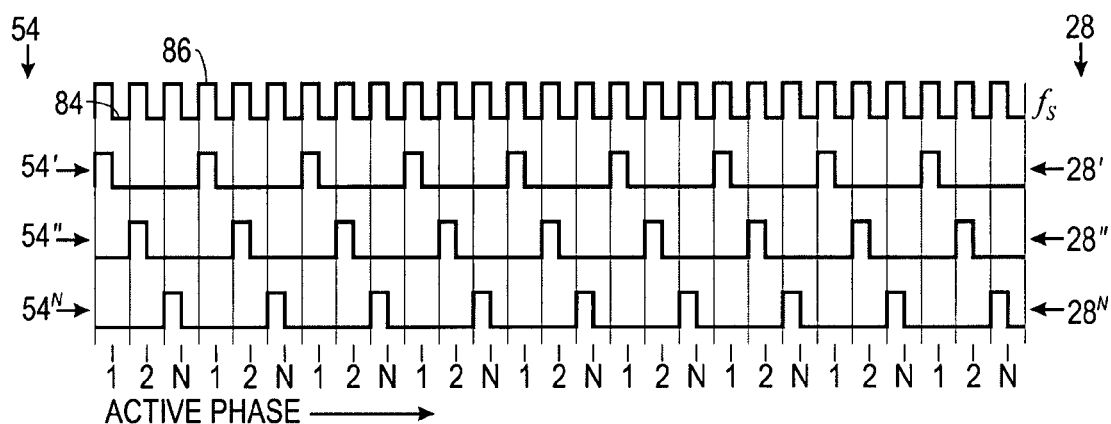
FIG. 8 shows a chart depicting the switching of each of N switches for the N phases of the power supply of FIG. 2 in accordance with a preferred embodiment of the present invention.

FIG. 8 shows a chart depicting the distribution and switching of switching pulses 86 to each of switches 30 for the N phases 28 in accordance with a preferred embodiment of the present invention. For the sake of simplicity, FIG. 8 assumes N phases 28 where N=3 (i.e., three phases 28). Those skilled in the art will appreciate that this is exemplary only, and that N may be any desired integer greater than one. The following discussion refers to FIGS. 2, 3, 4, and 8.

Within phase selector 50, PWM signal 84 is routed to a phase counter 136. Phase counter 136 identifies which of the N phases 28 is to be active at any given point in time. Desirably, phase counter 136 "counts" once for each switching pulse 86 in PWM signal 84, cycling as required. For example, in a three-phase application (i.e., where N=3, as in FIG. 8), phase counter 136 may count from zero to two, then on the receipt of the next switching pulse from PWM signal 84 be reset back to zero.

In the preferred embodiment, phase counter 136 is realized as a ring counter. Those skilled in the art will appreciate that this is not a requirement of the present invention, and that other embodiments of phase counter 136 may be used without departing from the spirit of the present invention.

Output from phase counter 136 are provided to a switching circuit 138, as well as to inductive-current generator 62 and to current-balance control 80 as discussed hereinbefore. This allows inductive-current generator 62 and current-balance control 80 to coordinate their activities with the currently active phase 28.

Switching circuit 138 sequentially distributes switching pulses 86 from PWM signal 84 to the control inputs of the N switches 30. Accordingly, the output from phase counter 136 identifies the target switch 30 to be switched on or off, and PWM signal 84 provides the timing for the switch-on and switch-off events. Signals 54 from switching circuit 138 couple to control inputs of each of switches 30 in each of phases 28. That is, a first signal 54' is coupled to the control inputs of a first switch 30' to effect first phase 28', a second signal 54" is coupled to the control inputs of a second switch 30" to effect second phase 28", and so forth until an $N^{th}$ signal $54^N$ is coupled to the control inputs of an $N^{th}$ switch $30^N$ to effect the $N^{th}$ phase $28^N$.

Collectively, switches 30 then switch at switching frequency $f_S$. For an $M^{th}$ one of the N phases 28, switching circuit 138 switches from an $M^{th}$ to an $(M+1)^{th}$ switch 30 under the control of phase counter 136.

In the preferred embodiment, switching circuit 138 may be implemented using a relatively simple decoding circuit (not shown) well known to those skilled in the art. It will be appreciated, however, that alternative implementations of switching circuit 138 may be used without departing from the spirit of the present invention.

In summary, the present invention teaches an apparatus and method for sliding-mode control multiphase switching power supply 24. Power supply 24 has a control circuit 40, suitable for multiphase systems 20, that is simple, reliable, and inexpensive, and requires only two state variables $x_1$ and $x_2$, regardless of the number N of phases 28. Power supply 24 is substantially independent of component tolerance, is tolerant of lockup conditions of switches 30, and shares current substantially equally among all phases.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of operating a multiphase switching power supply having N phases, where N is an integer greater than one, said method comprising:
monitoring an output voltage of said power supply;
deriving a first state variable of said power supply in response to said monitoring activity;
synthesizing a second state variable of said power supply in response to said deriving activity;
generating a comprehensive feedback signal from no more than said first and second state variables of said power supply;
translating said comprehensive feedback signal into a stream of switching pulses;
switching N switches in response to said stream of switching pulses; and
effecting one of said N phases with each of said N switches.

2. A method as claimed in claim 1 wherein said switching activity comprises:
switching said N switches collectively at a switching frequency; and
switching said N switches individually at N-times said switching frequency.

3. A method as claimed in claim 1 wherein said deriving activity comprises:
generating a fixed reference voltage; and
subtracting said output voltage from said fixed reference voltage to derive said first state variable.

4. A method as claimed in claim 1 wherein said synthesizing activity comprises extracting a derivative of said first state variable over time to synthesize said second state variable.

5. A method as claimed in claim 1 wherein said generating activity generates said comprehensive feedback signal as a single sliding surface for said N phases, said sliding surface having a value $\alpha x_1 + x_2$, where:
$\alpha$ is a constant greater than 0;
$x_1$ is said first state variable; and
$x_2$ is said second state variable.

6. A method as claimed in claim 1 wherein:
said power supply is a current-sharing multiphase switching power supply; and
said method additionally comprises:
monitoring a parameter of said power supply; and
balancing N inductive currents in response to said monitoring activity, wherein each of said N inductive currents is a current through one of N inductances.

7. A method as claimed in claim 6 wherein:
said method additionally comprises generating signals corresponding to said N inductive currents in response to said monitoring activity, wherein said signals are N synthesized inductive currents; and
said balancing activity comprises adjusting said comprehensive feedback signal for each of said N phases so that said N synthesized inductive currents are rendered more closely equal.

8. A method as claimed in claim 7 wherein:
said balancing activity additionally comprises:
computing a reference current as a summary-statistic of said N inductive currents; and
calculating an error current for each of said N phases, wherein, for an $M^{th}$ one of said N phases, where M is an integer having a range $1 \leq M \leq N$, said $M^{th}$ inductive current corresponds to a current through an $M^{th}$ one of said N inductances coupled to an $M^{th}$ one of said N switches effecting said $M^{th}$ phase, and wherein said $M^{th}$ error current is a difference between said $M^{th}$ inductive current and said reference current; and
said adjusting activity adjusts said comprehensive feedback signal for each of said N phases to compensate for said error current of each of said N phases.

9. A method as claimed in claim 8 wherein said computing activity computes said reference current to be an arithmetic mean of said N synthesized inductive currents.

10. A method as claimed in claim 8 wherein said adjusting activity adjusts said comprehensive feedback signal for each of said N phases so that each of said N inductive currents is rendered more closely equal to said reference current.

11. A method as claimed in claim 1 wherein:
said translating activity comprises generating said switching pulses at a rate that defines a switching frequency at which said switching circuit collectively switches said N switches; and
said switching activity comprises distributing said pulses sequentially among said N switches.

12. A method as claimed in claim 1 wherein:
said comprehensive feedback signal is a sliding surface;
said method additionally comprises forming a variable window for said sliding surface in response to said generating activity;
said translating activity translates said sliding surface into said stream of switching pulses at a switching frequency in response to said generating and forming activities; and
said switching activity switches said N switches at said substantially constant switching frequency.

13. A method as claimed in claim 12 wherein said forming activity comprises:
generating a reference frequency;
comparing said switching frequency to said reference frequency; and
maintaining said switching frequency substantially constant in response to said comparing activity.

14. A method as claimed in claim 1 additionally comprising:
generating pulses at a rate that defines a frequency at which said switching circuit switches said switches; and
distributing said pulses sequentially among said N switches.

15. A method as claimed in claim 1 additionally comprising:
distributing said stream of switching pulses sequentially among said N switches;
detecting a transient; and
redistributing at least one of said switching pulses to a different one of said N switches in response to said detecting activity.

16. A method as claimed in claim 1 wherein said switching activity comprises distributing each of said switching pulses sequentially among said N switches.

17. A multiphase switching power supply having N phases, where N is an integer greater than one, said power supply comprising:
N switches configured to be coupled to a bipolar power source;
N inductances, wherein each of said N inductances is coupled to one of said N switches;

a capacitance coupled to each of said N inductances and configured to be coupled across a load;

a monitor circuit coupled to each of said N inductances and said capacitance and configured to monitor a parameter of said power supply;

a feedback-signal generator coupled to said monitor circuit and configured to generate a comprehensive feedback signal in response to said parameter;

a pulse-width-modulation (PWM) generator coupled to said feedback-signal generator and configured to translate said feedback signal into a stream of switching pulses; and a phase selector coupled to said N switches, coupled to said PWM generator, and configured to switch said N switches in response to said stream of switching pulses so that each of said N switches effects one of said N phases.

18. A power supply as claimed in claim 17 wherein:
said PWM generator generates said stream of switching pulses at a switching frequency;
said phase selector collectively switches said N switches at said switching frequency; and
said phase selector individually switches each of said N switches at substantially N−1 times said switching frequency.

19. A power supply as claimed in claim 17 wherein:
said monitor circuit is configured to monitor an output voltage of said power supply; and
said power supply additionally comprises:
  a first state-variable generator coupled to said monitor circuit and configured to generate a first state variable as a difference between said output voltage and a fixed reference voltage equal to an idealized output voltage of said power supply; and
  a second state variable generator coupled to said first state-variable generator and configured to synthesize a second state variable as a derivative of said first state variable over time.

20. A power supply as claimed in claim 19 wherein:
said second state variable generator comprises an inductive-current generator coupled to said monitor circuit and configured to generate N synthesized inductive currents corresponding to N inductive currents in response to said output voltage, wherein of said N inductive currents is a current through one of said N inductors; and
said PWM generator comprises a current-balance control coupled to said feedback-signal generator and configured to adjust said feedback signal for each of said N phases so that said N synthesized inductive currents are substantially equal.

21. A power supply as claimed in claim 20 wherein:
said current-balance control computes a reference current as a summary-statistic of said N inductive currents;
said current-balance control calculates an error current for each of said N phases, wherein, for an $M^{th}$ one of said N phases, where M is an integer having a range $1 \leq M \leq N$, said $M^{th}$ inductive current corresponds to a current through an $M^{th}$ one of said N inductances coupled to an $M^{th}$ one of said N switches, said $M^{th}$ switch effecting said $M^{th}$ phase; and
said current-balance control adjusts said feedback signal for each of said N phases to compensate for said error current of each of said N phases.

22. A power supply as claimed in claim 21 wherein said current-balance control adjusts a sliding surface for each of said N phases so that each of said N synthesized inductive currents is substantially equal to said reference current.

23. A power supply as claimed in claim 21 wherein said summary-statistic is an arithmetic mean of said N synthesized inductive currents.

24. A power supply as claimed in claim 17 wherein said feedback-signal generator comprises a sliding-surface generator configured to generate said comprehensive feedback signal as a single sliding surface for said N phases.

25. A power supply as claimed in claim 24 wherein said sliding surface has a value $\alpha x_1 + x_2$, where:
α is a constant having a value greater than zero;
$x_1$ is a first one of said two state variables; and
$x_2$ is a second one of said two state variables.

26. A power supply as claimed in claim 25 wherein said constant α has a range, $0 \leq \alpha \leq (\tau)^{-1}$, where τ is a time constant having a value RC, where R is a value of a resistive component of said load, and C is a value of said capacitance.

27. A power supply as claimed in claim 25 wherein:
said first state variable has a value $V_{Ref} - V_{Out}$, where $V_{Ref}$ is a value of a reference voltage, and $V_{Out}$ is a value of an output voltage of said power supply; and
said second state variable is a derivative of said first state variable over time.

28. A power supply as claimed in claim 17 wherein:
said power supply additionally comprises an inductive current generator configured to synthesize N synthesized inductive currents from said first state variable; and
said PWM generator comprises a current-balance control coupled to said feedback signal generator, coupled to said inductive current generator, and configured to adjust said comprehensive feedback signal so that N inductive currents are rendered substantially equal in response to said N synthesized inductive currents, wherein each of said N inductive currents is a current through one of said N inductances.

29. A power supply as claimed in claim 17 wherein:
said PWM generator comprises a constant-frequency control coupled to said feedback-signal generator and configured to produce said stream of switching pulses at a substantially constant frequency; and
said phase selector switches said N switches at said substantially constant frequency.

30. A power supply as claimed in claim 29 wherein:
said constant-frequency control comprises a reference generator configured to generate a substantially constant reference frequency;
said constant-frequency control additionally comprises a frequency comparator coupled to said reference generator and configured to compare a frequency of said stream of switching pulses to said reference frequency; and
said constant-frequency control maintains said stream of switching pulses at said substantially constant frequency in response to said frequency comparator.

31. A power supply as claimed in claim 17 additionally comprising a transient control coupled to said PWM generator, coupled to said phase selector, configured to detect an occurrence of a transient in said power supply, and to redistribute one of said switching pulses to a different one of said N switches upon said occurrence.

32. A current-sharing multiphase sliding-mode switching power supply having N phases, where N is an integer greater than one, said power supply comprising:

N switches configured to be coupled to a bipolar power source, wherein each of said N switches effects one of said N phases;

N inductances, wherein each of said N inductances is coupled to one of said N switches;

a capacitance coupled to each of said N inductances and configured to be coupled across a load;

a monitor circuit coupled to each of said N inductances and said capacitance and configured to monitor a parameter of said power supply;

an inductive-current generator coupled to said monitor circuit and configured to synthesize N synthesized inductive currents in response to said parameter;

a sliding-surface generator coupled to said monitor circuit and configured to generate a single sliding surface for said N phases;

a current-balance control coupled to said sliding-surface generator and said inductive-current generator, and configured to adjust said sliding surface in response to said N synthesized inductive currents so that N inductive currents are substantially equal, wherein each of said N inductive currents is a current through one of said N inductances;

a translation circuit coupled to said sliding-surface generator and configured to translate said sliding surface into a stream of switching pulses in response to said sliding surface; and a switching circuit coupled to said N switches, coupled to said translation circuit, and configured to switch said N switches in response to said stream of switching pulses.

33. A power supply as claimed in claim 32 wherein:
said monitor circuit monitors said N inductive currents; and
said current-balance control adjusts said sliding surface for each of said N phases so that said N inductive currents are substantially equal.

34. A power supply as claimed in claim 32 wherein:
said monitor circuit monitors an output voltage of said power supply; and
said inductive-current generator synthesizes said N synthesized inductive currents in response to said output voltage.

35. A power supply as claimed in claim 34 wherein:
said current-balance control computes a reference current as a summary-statistic of said N inductive currents;
said current-balance control calculates an error current for each of said N phases, wherein, for a given one of said N phases, said error current is a difference between said reference current and said inductive current for said given phase; and
said current-balance control adjusts said sliding surface for each of said N phases to compensate for said error current of each of said N phases.

36. A power supply as claimed in claim 35 wherein:
said current-balance control computes a reference current as a summary-statistic of said N inductive currents;
said current-balance control calculates an error current for each of said N phases, wherein, for an $M^{th}$ one of said N phases, where M is an integer having a range $1 \leq M \leq N$, said $M^{th}$ inductive current corresponds to a current through an $M^{th}$ one of said N inductances coupled to an $M^{th}$ one of said N switches, said $M^{th}$ switch effecting said $M^{th}$ phase; and
said current-balance control adjusts said sliding surface for each of said N phases to compensate for said error current of each of said N phases.

37. A power supply as claimed in claim 36 wherein said summary-statistic is an arithmetic mean of said N synthesized inductive currents.

38. A power supply as claimed in claim 36 wherein said current-balance control adjusts said sliding surface for each of said N phases so that each of said N synthesized inductive currents is substantially equal to said reference current.

39. A system comprising:
a bipolar power source configured to supply direct-current electrical energy in a first form;
an electronic device configured to utilize direct-current electrical energy in a second form; and
a sliding-mode switching power supply having N phases, where N is a positive integer greater than one, coupled between said bipolar power source and said electronic device, and configured to convert said direct-current electrical energy in said first form into said direct-current electrical energy in said second form, wherein said power supply comprises:
  N switches coupled to said bipolar power source, wherein each of said N switches effects one of said N phases;
  N inductances, wherein each of said N inductances is coupled to one of said N switches;
  a capacitance coupled to said N inductances and said electronic device;
  a monitor circuit coupled to said N inductances and said capacitance, and configured to monitor an output voltage of said power supply;
  a feedback-signal generator configured to generate a comprehensive feedback signal for said N phases;
  a pulse-width-modulation (PWM) generator comprising:
    a current-balance control coupled to said monitor circuit and said feedback-signal generator, and configured to adjust said feedback signal so that N inductive currents are substantially equal, wherein each of said N inductive currents is a current through one of said N inductances; and
    a translation circuit coupled to said current-balance control feedback-signal generator and configured to translate said feedback signal into a stream of switching pulses at a switching frequency; and
  a phase selector coupled to said N switches, coupled to said PWM generator, and configured to sequentially switch said N switches in response to said stream of switching pulses.

40. A system as claimed in claim 39 wherein:
said power supply additionally comprises an inductance-current generator configured to generate signals corresponding to said N inductive currents in response to said output voltage, wherein said signals are N synthesized inductive currents; and
said current-balance control adjusts said sliding surface for each of said N phases so that said N synthesized inductive currents are substantially equal.

41. A system as claimed in claim 40 wherein:
said current-balance control computes a reference current as a summary-statistic of said N inductive currents;
said current-balance control calculates an error current for each of said N phases, wherein, for an $M^{th}$ one of said N phases, where M is an integer having a range $1 \leq M \leq N$, said $M^{th}$ inductive current corresponds to a current through an $M^{th}$ one of said N inductances coupled to an $M^{th}$ one of said N switches effecting said $M^{th}$ phase, and wherein said $M^{th}$ error current is a difference between said $M^{th}$ inductive current and said reference current; and said current-balance control adjusts said sliding surface for each of said N phases to compensate for said error current of each of said N phases.

42. A system as claimed in claim 41 wherein said current-balance control adjusts said sliding surface for each of said N phases so that each of said N synthesized inductive currents is substantially equal to said reference current.

43. A system as claimed in claim 39 wherein said feedback-signal generator comprises a sliding-surface generator configured to generate a single sliding surface for said N phases as said feedback signal.

44. A system as claimed in claim 39 wherein said electronic device is one of a computing device and a communications device.

* * * * *